United States Patent [19]

Borner et al.

[11] Patent Number: 5,024,001
[45] Date of Patent: Jun. 18, 1991

[54] WHEEL ALIGNMENT RIM CLAMP CLAW

[75] Inventors: Willy Borner, Cupertino; Kenneth A. McQueeney, Los Gatos, both of Calif.

[73] Assignee: Balco, Incorporated, San Jose, Calif.

[21] Appl. No.: 255,116

[22] Filed: Oct. 7, 1988

[51] Int. Cl.[5] .............................................. G01B 21/26
[52] U.S. Cl. ................................. 33/203.18; 33/288; 33/336; 248/205.1
[58] Field of Search .................... 33/336, 347, 203.18, 33/203.19, 203.2, 203.21; 248/201, 205.1, 225.31, 227; 356/155

[56] References Cited

U.S. PATENT DOCUMENTS

| | | | |
|---|---|---|---|
| 2,285,965 | 6/1942 | Halstead | 33/336 |
| 2,582,427 | 1/1952 | Greenleaf | 33/203.18 |
| 2,680,974 | 6/1954 | Hunter | 248/201 |
| 3,035,447 | 5/1962 | Carrigan | 248/201 |
| 3,986,267 | 10/1976 | Taylor | 33/203.19 |
| 3,990,666 | 11/1976 | Morrison et al. | 33/203.21 |
| 4,185,917 | 1/1980 | Alsina | 33/336 |
| 4,335,519 | 6/1982 | Alsina | 33/336 |
| 4,337,581 | 7/1982 | Eck | 33/203.18 |
| 4,815,216 | 3/1989 | Swayne | 33/203.18 |

Primary Examiner—Thomas B. Will
Attorney, Agent, or Firm—Irell & Manella

[57] ABSTRACT

An improved claw for use in a wheel alignment rim clamp is disclosed. The claw as a curved bladelike tip which allows it to grip the rim of wheels including mag type wheels even when there is minimal clearance between the rim and its associated tire. The claw has a tip with a curved inner surface preferably of gradually increasing radii of curvature, and a beveled portion opposite the inner surface. The claw is shaped such that when its associated clamp is tightened, the bladelike tip tends to engage the rim more securely and the claw orients itself to grip the rim of a wheel firmly without damage thereto.

7 Claims, 5 Drawing Sheets

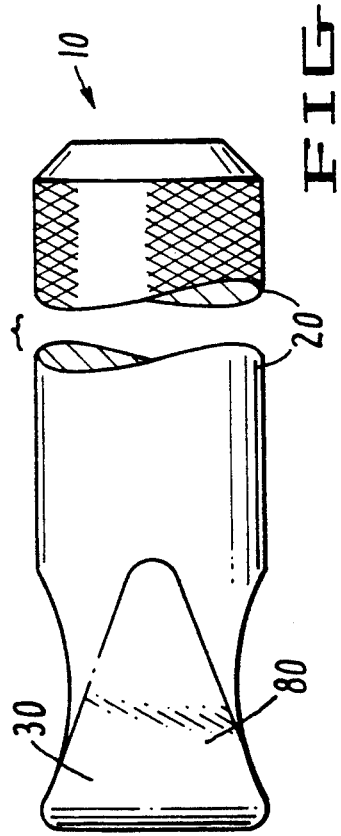
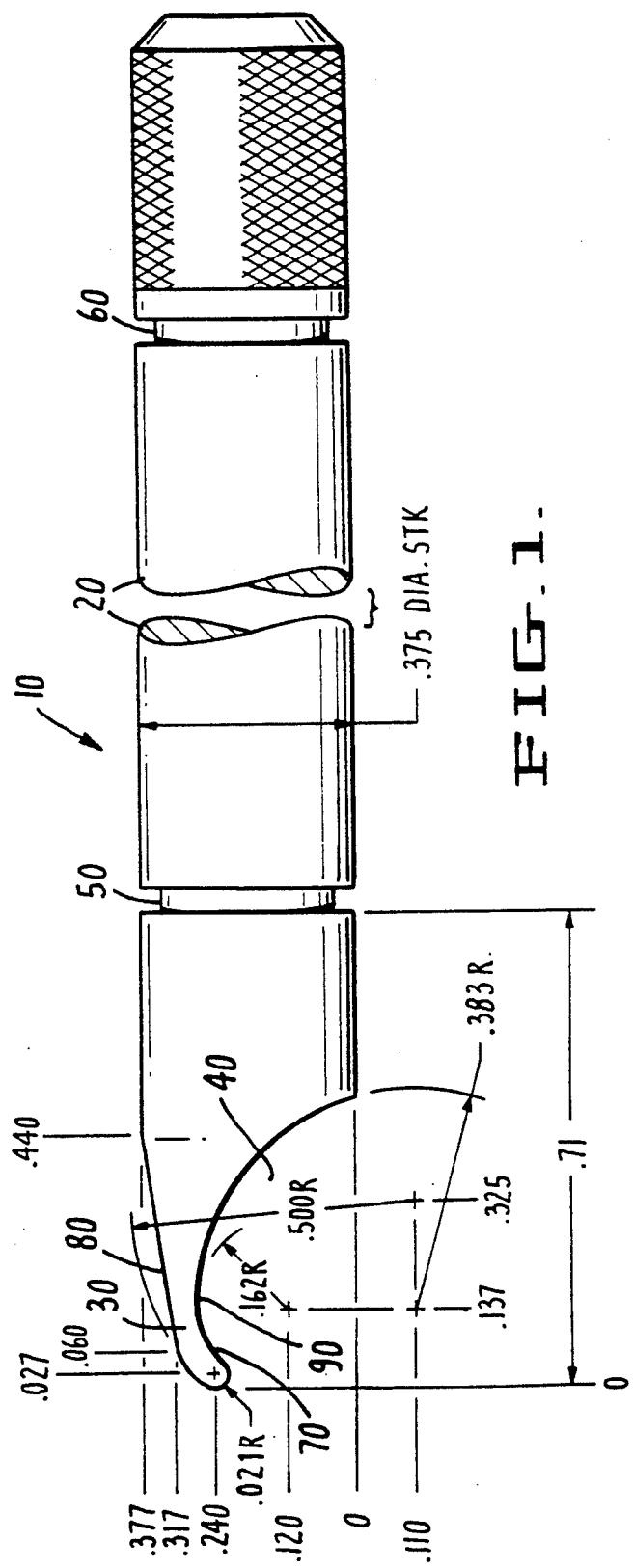

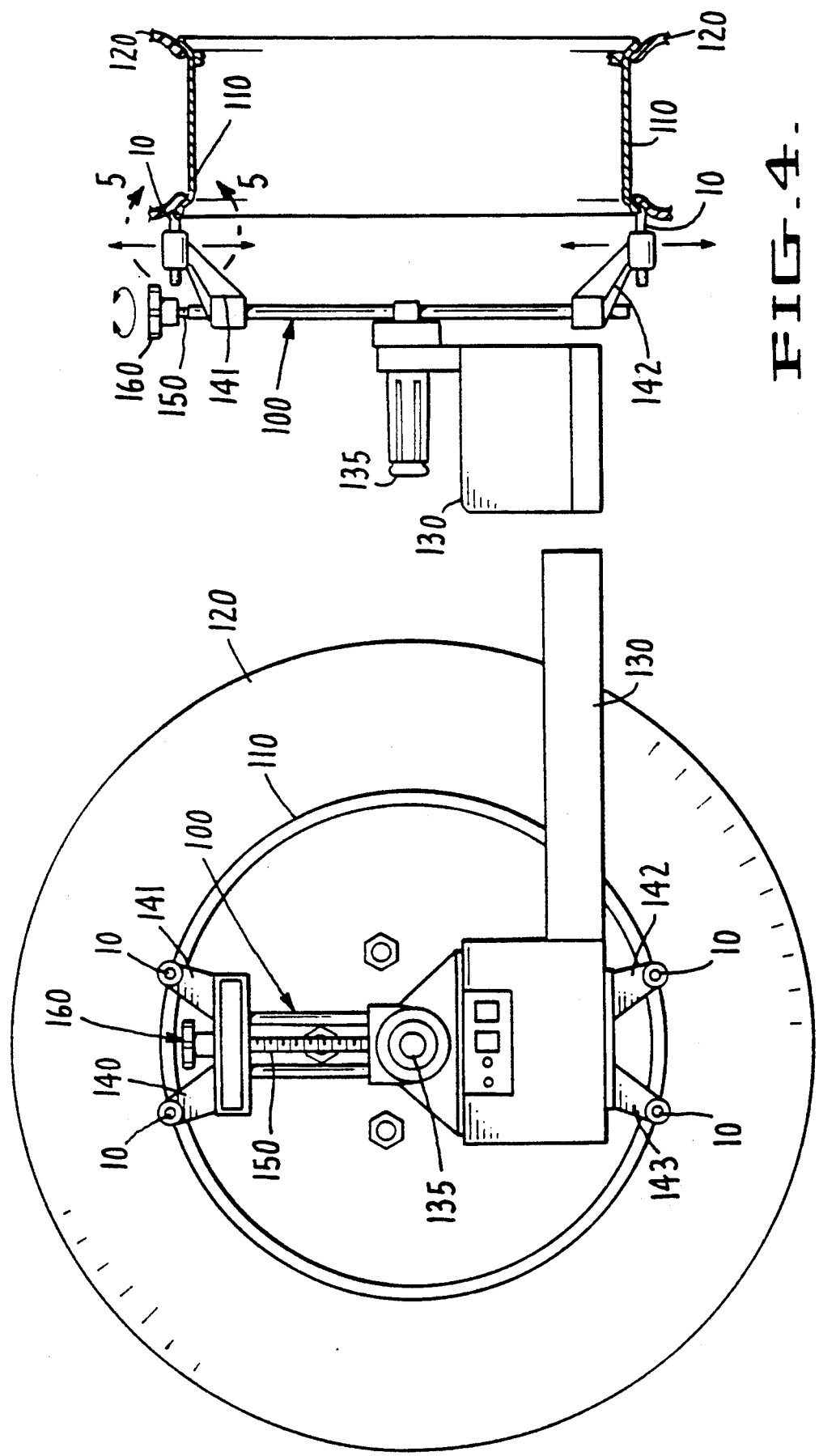

U.S. Patent   June 18, 1991   Sheet 4 of 5   5,024,001
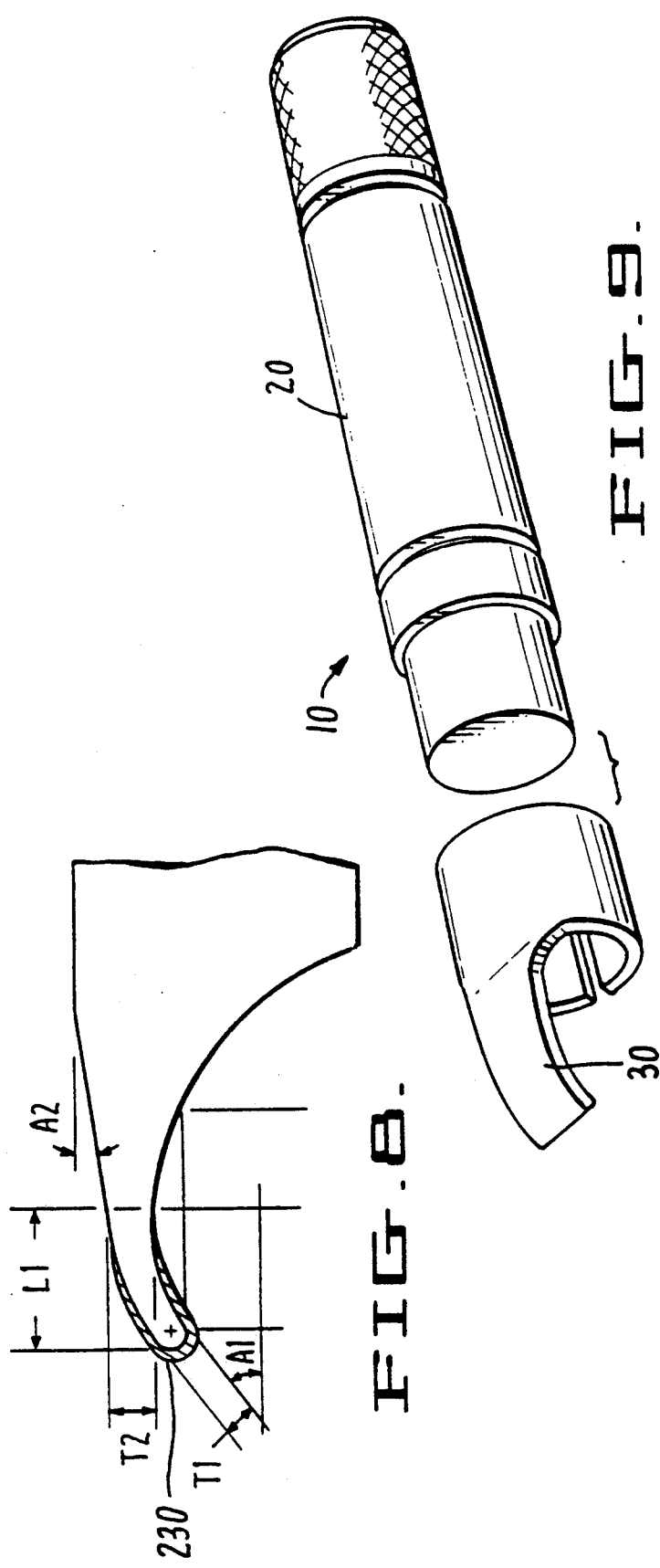
FIG. 8.
FIG. 9.
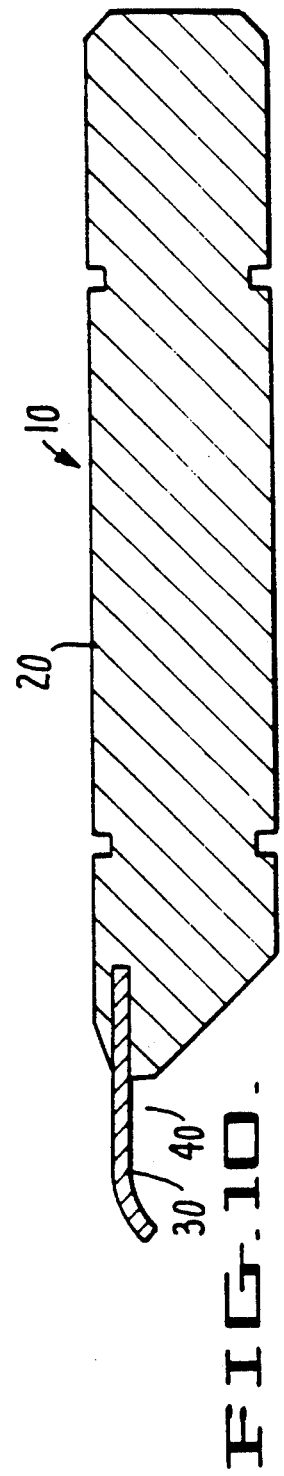
FIG. 10.

WHEEL ALIGNMENT RIM CLAMP CLAW

BACKGROUND OF THE INVENTION

1. Field of the Invention

This invention relates to wheel alignment rim clamps, i.e., clamps for affixing wheel alignment measuring devices to the wheels of vehicles. More particularly, it concerns an improved design for claws or fingers present in these rim clamps to grip the wheel.

2. Description of Prior Art

Wheel alignment systems have been in common use for generations. In such systems, it is necessary to make a physical connection between the wheels being aligned and various gauges and measuring devices. In some systems, this can be carried out by attaching the gauges or measuring devices to the spindle or axle which carries the wheel, but by far the more common approach is to mount the gauges or measuring devices to the wheel itself.

The mounting of the alignment equipment on the wheel is usually carried out by first affixing an adjustable gripping device to the wheel and then mounting the measuring device on an appropriate fitting on the gripping device. These gripping devices are known in the trade as "rim clamps" or "wheel clamps" since they are mechanical devices which physically "clamp" onto the wheel. It is conventional for the rim clamps to have a plurality (usually three or four) of fingers or claws that gain a purchase on the rim of the wheel to carry out the actual attachment.

Conventional rim clamps were designed for use with pressed steel wheels and high aspect ratio tires. With these prior wheel-tire combinations it is easy to locate surfaces to which the gripping devices can attach. There generally is a good gripping surface provided by the substantial clearance between the sidewall of the tire and the outside lip of the wheel rim. Similarly, conventional steel wheels often have painted horizontal surfaces on their faces which can serve as engagement points. Also, steel wheels generally carry decorative wheel covers that cover any scratches which the gripping devices might cause. Because of these advantageous features of old style wheels and tires, conventional gripping devices have taken the form of serrated rods, "fat" hooks and rubber "friction" pads. Typical examples of these devices are shown in FIGS. Prior Art A, B, and C.

With the wide adoption of "mag" wheels and modern low aspect ratio tires, a range of failings of the prior rim gripping devices have surfaced. In particular, the cast mag type wheels do not present the convenient purchase points present in their predecessors. The clearance between the tire sidewall and the lip of the wheel rim is often too small. Often the rim lip is much thicker than with steel wheels. Also, the high cost of mag wheels has made their owners much more particular about the wheels' appearance and unwilling to accept the introduction of scratches, mars and the like during the mounting of alignment instruments. Moreover, the visible surfaces of the wheels are often highly polished so as to prevent easy use of the "friction" type attachment pads. Some of these problems are illustrated in FIGS. Prior Art D and E.

These problems have led to poorer quality mounting of alignment instruments to wheels than was previously the norm, with resulting slippage during alignment and in some cases unexpected accidental decoupling of the alignment instruments from the wheels.

It is a fundamental object of this invention to provide a rim clamp claw which does not present the failings of these prior devices.

It is also an object of this invention to provide an improved rim clamp incorporating this new claw which can accommodate the broad variety of rim shapes and materials and tire geometries now in use, preferably gripping the outside surface rim but also, if desired being adaptable to grip an inside surface.

It is another object of this invention to provide a claw or finger for use with a rim clamp which achieves a good purchase on a wide range of wheels without visibly scratching or marring the wheel rim.

It is a further object of the invention to provide fingers or claws for a rim clamp which are adapted to clamp a wheel by grasping a portion of the rim which is normally covered by the tire.

SUMMARY OF THE INVENTION

The present invention is directed to an improved rim clamp claw. This claw is adapted for gripping a wheel rim. The claw has a claw body, typically cylindrical in shape. One end of the body terminates with a rim-engaging, inwardly curved bladelike tip. A relief is present beneath the bladelike tip. This relief is sized to clear the rim of the wheel and cooperates with the curvature of the bladelike tip to present a thickness which is small enough to fit between the tire sidewall and the rim lip. In a presently preferred embodiment of the inner surface of the tip (that is, the surface bounding the relief) is curved such that when the rim clamp employing the clamp is tightened onto the rim, the claw self-engages and locks tightly on the rim. In other preferred embodiments, the rim clamp claw can include an antifriction surface on one or more of its surfaces to assist mounting of the rim clamp.

In another aspect, the present invention concerns an improved rim clamp incorporating the claws of the present invention.

BRIEF DESCRIPTION OF THE DRAWINGS

FIGS. Prior art A, B, and C are cross-sectional illustrations of conventional ways of gripping a wheel rim useful with standard steel wheels.

FIGS. Prior Art D and E are cross-sectional illustrations of the inability of conventional gripping devices to work effectively with more modern "mag" wheel-tire geometries.

FIG. 1 shows a side view of a presently preferred wheel alignment rim clamp claw of the present invention.

FIG. 2 shows a top view of the claw of FIG. 1.

FIG. 3 is an elevation of four claws of the present invention in use in a wheel alignment rim clamp with an associated alignment measuring head.

FIG. 4 is an end view of the set-up of FIG. 3.

FIG. 8 is a schematic cross-section of the bladelike tip of the claw illustrating pertinent features of its geometry.

FIG. 9 is a partially exploded perspective view of an alternative embodiment of the claw of this invention.

FIG. 10 is a cross-sectional view of yet another embodiment of the claw of this invention.

DESCRIPTION OF THE PREFERRED EMBODIMENTS

Figure 5:
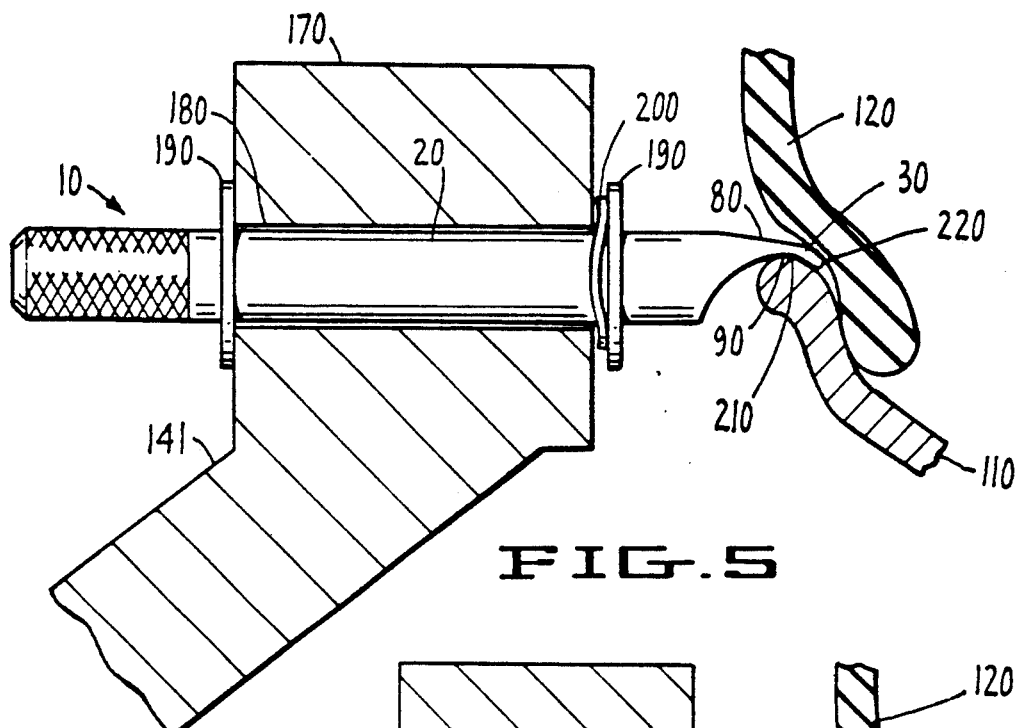
FIG. 5 is an enlarged, partially cross-sectional view of a portion of the set-up illustrated in FIG. 4, showing the improved claw of the invention engaging a wheel rim with a tire in place and illustrating the way the bladelike tip fits between the rim and the tire.

As shown in FIGS. 1 and 2, the claw 10 of the present invention includes a central body or shaft 20, a curved, bladelike tip 30, and a relief 40. The claw 10 is generally cylindrical in configuration, and in the preferred embodiment shown in FIGS. 1 and 2, has dimensions substantially as shown in FIGS. 1 and 2 (those dimensions are expressed in inches). The body 20 of claw 10 includes a pair of annular circumferential grooves 50 and 60 for inserting retaining rings for fastening the claw into the wheel clamp. Other features of the claw include a downward curve to the tip 30. This can be accomplished such as by the shape of relief 40 and by beveling the top surface 80 of the tip. The inner surface 70 of tip 30 defines relief 40. In the embodiment shown, relief 40 is substantially rounded in cross-section. In the embodiment shown having a decreasing-radius semi-circular cross-section, the downward slope of the tip defined by the top surface 80 and bottom surface 70, preferably curves such that the end of the tip is below the uppermost portion 90 of recess 40. With this configuration, tightening of the wheel clamp can cause the tips to self-engage and self-tighten, and thus insure a tight fit, or the downward slope of the nose end of surface 70 relative to portion 90 cause the tip to move so that portion 90 contacts the rim as the clamp carrying the claw is tightened.

Tip 30 is bladelike in character. That means it is wider and longer than it is thick. Generally it is preferred that the end of tip 30 be substantially uniform in thickness. That is, that surfaces 80 and 70 are substantially parallel and define a thickness of less than about two-tenths of an inch over the first 0.15 inches of the tip.

Exemplary dimensions of the region of claw 10 are given in FIG. 1.

The body 20 includes a pair of annular grooves 50 and 60 for inserting retaining rings for fastening the claw into the rim clamp.

A typical and preferred application of the claw of this invention is as part of a rim clamp which is, in turn, part of a wheel aligning system. Such a clamp and its association with an aligning system are shown in FIGS. 3 and 4.

The system illustrated is a simplified version of the INSTALIGNER Model WA5000 Wheel Alignment System available from Snap-on Tools Corporation of Kenosha, Wisc. A 1988 User's Manual regarding the INSTALIGNER WA5000 System is incorporated herein by reference.

The alignment system shown includes a rim clamp 100, shown affixed to wheel rim 110, which also carries tire 120. An alignment head 130 is illustrated suspended off of a spindle 135 centered in the middle of rim clamp 100. Four claws 10 of the present invention are illustrated gripping rim 110. One of these claws is located in each of four legs 140, 141, 142 and 143 of the rim clamp. The rim clamp is equipped with a lead screw 150 and adjustment knob 160. When knob 160 is rotated, it turns lead screw 150. When lead screw 150 is rotated in one direction, it causes legs 140 and 141 to separate further from legs 142 and 143, and when rotated in the other direction, causes legs 140 and 141 to approach legs 142 and 143.

FIG. 5 shows an enlarged view of the end 170 of the leg 141. The ends of each of the four legs are identical. End 170 includes an internal bore 180 for receiving the shaft 20 of the claw 10. Retaining rings 190 and 191 are utilized, along with a wave washer 200, thus retaining the clamp 10 within its position within the bore 180. The wave washer 200 acts to urge the clamp 10 forwardly, such that each of the four claws 10 is in the same position relative to its respective ends.

When the claws 10 are mounted in the ends 170, they may be rotated by hand (grasping their knurled portions), so as to permit their tip 30 to grasp an exterior surface 210 of the rim 110. (The claws 10 may alternatively be oriented so as to permit tip 30 to grasp an interior surface of the rim 110. However, the invention will be described in the preferred configuration where the exterior surface 210 is grasped.)

Figure 6:
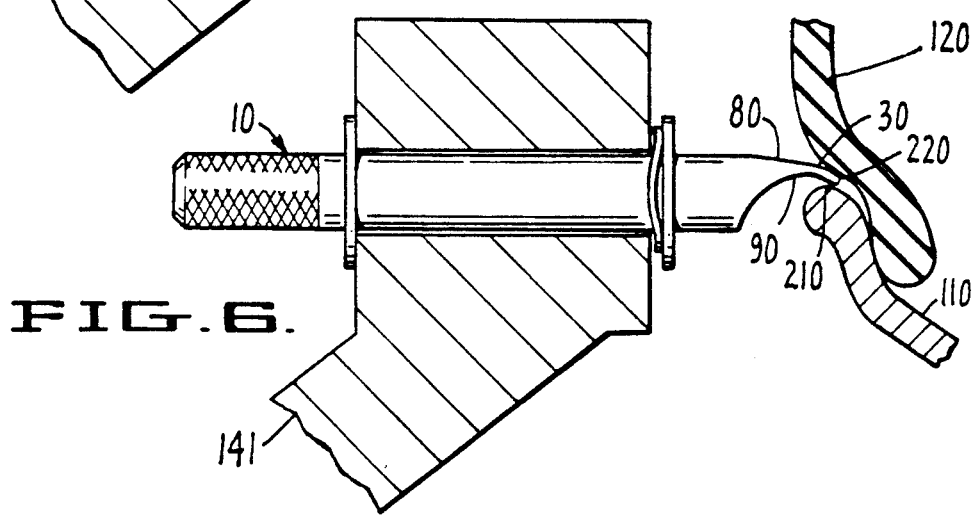
FIG. 6 and FIG. 7 are two additional views similar to FIG. 5, illustrating in a "time sequence" the way the claw of the invention grips the rim and self-engages as the rim clamp employing it is tightened.
Figure 7:
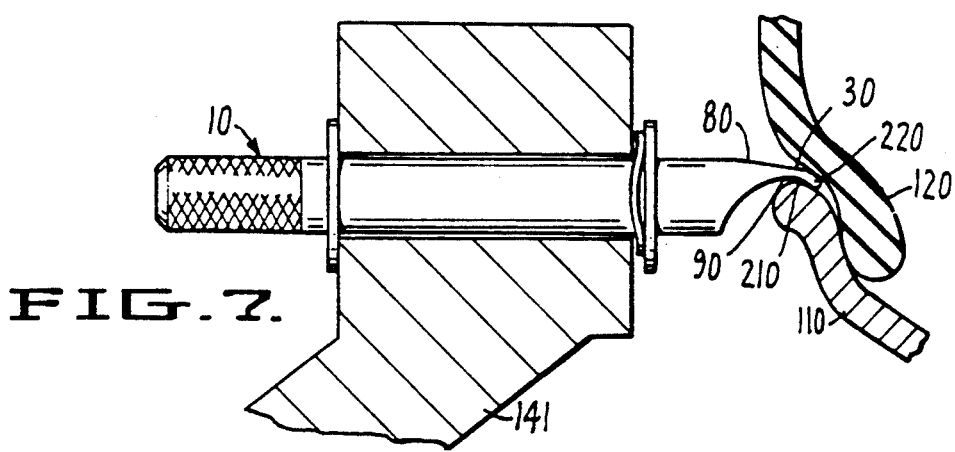
Figure 11:
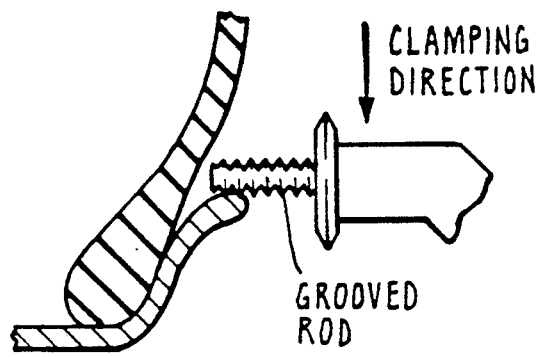
Figure 13:
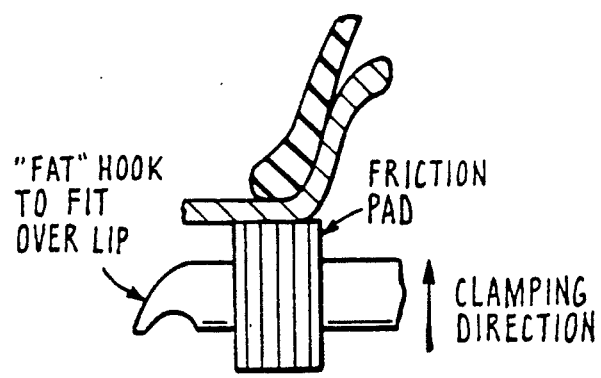
Figure 12:
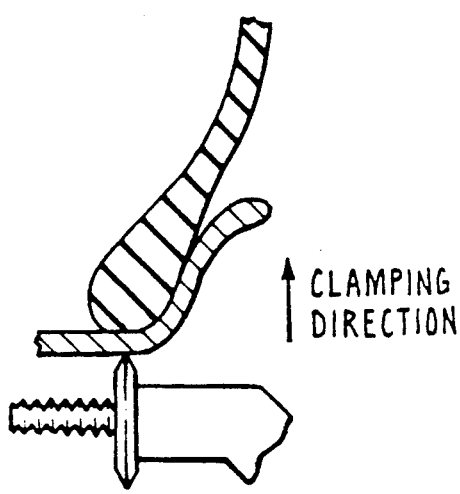
Figure 14:
Figure 15:
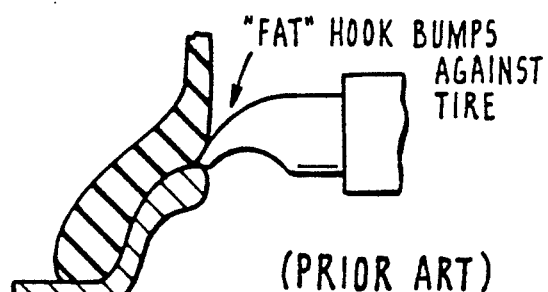

To affect a clamping, the knob 160 is rotated such that the distance between the claws on opposing ends of the clamp 100 is greater than the outside diameter of the rim 110. As shown in FIG. 6, the rim 110 and clamp 100 are then positioned such that the exterior surface 210 is near the tips 30 of claws 10. The knob 160 is then rotated to draw the ends closer together. As shown sequentially in FIGS. 6, then 7, then 5, typically the end 220 of the tip 30 of the claw 10 will engage the exterior surface of the rim 110, and as the knob 160 is rotated, the claw 10 is drawn into the configuration relative to the rim 110 which is shown in FIG. 5 with the bladelike configuration of the tip permitting the claw to easily slide between the rim 110 and tire side wall 120. Because of the curvature of the inner surface 70 of the tip 30, the region of the inner surface 70 which first contacts the exterior surface 210 is not necessarily an equilibrium part. Thus, exerting force (by rotating the knob 160) on the clamp 100 in the tightening direction causes the claw 10 to automatically adjust itself in the direction which causes the rim 110 to go to point 90.

The claw 10 also automatically adjusts its position in a rotational direction in bore 180, such that the inner surface 70 conforms as closely as possible to the exterior surface 210. As the knob 160 is rotated, then, the clamp 100 automatically is adjusted in three dimensions, namely in vertical and horizontal directions, and its component claws 10 are adjusted rotationally. As the claw 10 is drawn inwardly, the beveled surface 80 contacts an exterior surface of the tire 120. But because of the curved bladelike shape of tip 30 and the beveled surface 80, the tip 30 slides between the exterior surface of the rim and the surface of the tire, resulting in the configuration shown in FIG. 5. This ensures a solid, reliable clamping action without any damage to or marring of the rim.

An especial advantage of the design of the present invention is that it can be utilized with wheel designs wherein there is little or no clearance between the tire and the exterior surface of the rim. Thus, when the tip 30 of a claw 10 encounters a tire where there is little or no clearance with respect to the exterior surface of the rim, the beveled surface 80 and curved bladelike cross-section of the tip 30 are still able to slide in between the rim and the tire. This is an advantage not achieved by devices presently available, as shown in the prior art drawings.

The performance of the claw of the present invention is dependent upon the geometry of its curved bladelike tip. Turning to FIG. 8, features of this geometry and preferred embodiments thereof are described. A first dimension of interest is the thickness of the bladelike tip, denominated T1 in FIG. 8. T1 is the thickness of the tip over its first or end 0.1 inch. Over this length, T1 should not exceed 0.1 inches, and preferably is 0.075 inches or less. A second description of the bladelike character of the tip of the claw is dimension T2. This is the thickness measured 0.3 inch from the tip (i.e., L1 equals 0.3 inches). T2 should not exceed 0.2 inches, and preferably does not exceed 0.15 inches. Over the end of the tip, the inner and outer surfaces are substantially parallel, as shown in FIG. 8. The tip is curved downward, as shown in FIG. 8, with the angle A1 of this downward tilt being at least about 10° and generally not more than about 45°. Another angle of interest is the slope of the beveled top surface, shown as angle A2. This preferably is about 10°, and generally should not exceed about 30°. Other preferred features include a rounded (broken) surface on the end of the bladelike tip to avoid gouging or digging. As shown in this figure 9S 230, it is sometimes advantageous to apply an antifriction surface to the top surface of the bladelike tip and/or to the inner surface of the relief. Typical nonfriction surfaces could include nylon, teflon, or other fluorocarbon or silicone materials. The claws of the present invention are quite small relative to claws used heretofore. Accordingly, they must be made out of a tough material. As a rule steel, and especially high-strength tool steel, is often employed as a preferred material of construction.

The claw of the present invention can take on other configurations as long as the desired geometry is met. FIGS. 9 and 10 illustrate two alternative constructions for a claw. In FIG. 9 a claw end corresponding to tip 30 is fabricated from spring steel or the like and is welded to shaft 20. In FIG. 10 a spring steel tip is inserted into a slot in body 20 to give the desired configuration.

We claim:

1. A claw for use in a wheel alignment rim clamp and capable of engaging the outer rim of a tire-carrying wheel said claw including a cylindrical arcing claw body for rotatable mounting in the rim clamp with the axis of the body being perpendicular to the plane defined by the outer rim of the wheel and terminating in a rim-engaging inwardly continuously curving arcing bladelike tip the inward curve of the arcing tip defining a rim clearing relieved region in the body with the cross sectional thickness of the body in the tip and relieved region being small enough for the tip to fit between the rim and the tire.

2. In an apparatus for temporarily attaching a wheel alignment measuring head to a tire-carrying wheel of a vehicle, which apparatus includes a plurality of claws for engaging the outside of the rim of the wheel and means for moving the claws relative to one another so as to surround and grip the rim of the wheel the improvement comprising configuring each of the claws with a cylindrical claw body terminating in a rim-engaging continuously inwardly curving arcing bladelike tip the inward curve of the arcing tip defining a rim clearing relieved region in the body with the cross sectional thickness of the body in the tip and relieved region being small enough for the tip to fit between the rim and the tire, said cylindrical claw bodies being rotatably attached to the apparatus with their axis substantially perpendicular to the plane defined by the outer rim of the wheel.

3. In an apparatus for temporarily attaching a wheel alignment measuring head to a tire-carrying wheel of a vehicle, which apparatus includes a plurality of claws for engaging the outside of the rim of the wheel, the improvement comprising configuring each of the claws as a cylinder with a continuously inwardly curved engagement end with a rim-engaging arcing bladelike tip and an adjacent connecting region having a rim-clearing arcing internal relief and having a cross-sectional thickness in the tip and at least the first 0.3 inches of said connecting region of not more than 0.2 inches so as to permit the engagement end to smoothly fit between the rim and the tire and having a radius of curvature in the continuously curving engagement end which decreases at the tip, said cylindrical claw bodies being rotatably attached to the apparatus with their axis substantially perpendicular to the plane defined by the outer rim of the wheel.

4. The apparatus of claim 3 wherein the inner and outer surfaces of the bladelike tip are substantially parallel.

5. The apparatus of claim 3 wherein the outer surface of the tip region is beveled to fit between the rim and the tire.

6. The apparatus of claim 3 wherein the outer surface of the rim-engaging arcing bladelike tip is beveled to an angle less than 30° from the axis of the cylindrical claw body to enable the tip to fit between the rim and the tire.

7. The apparatus of claim 3 additionally comprising an anti-friction surface on the tip.

* * * * *